C. J. GETERMAN.
TROLLEY STAND OR BASE.
APPLICATION FILED JUNE 4, 1908.
912,557.
Patented Feb. 16, 1909.
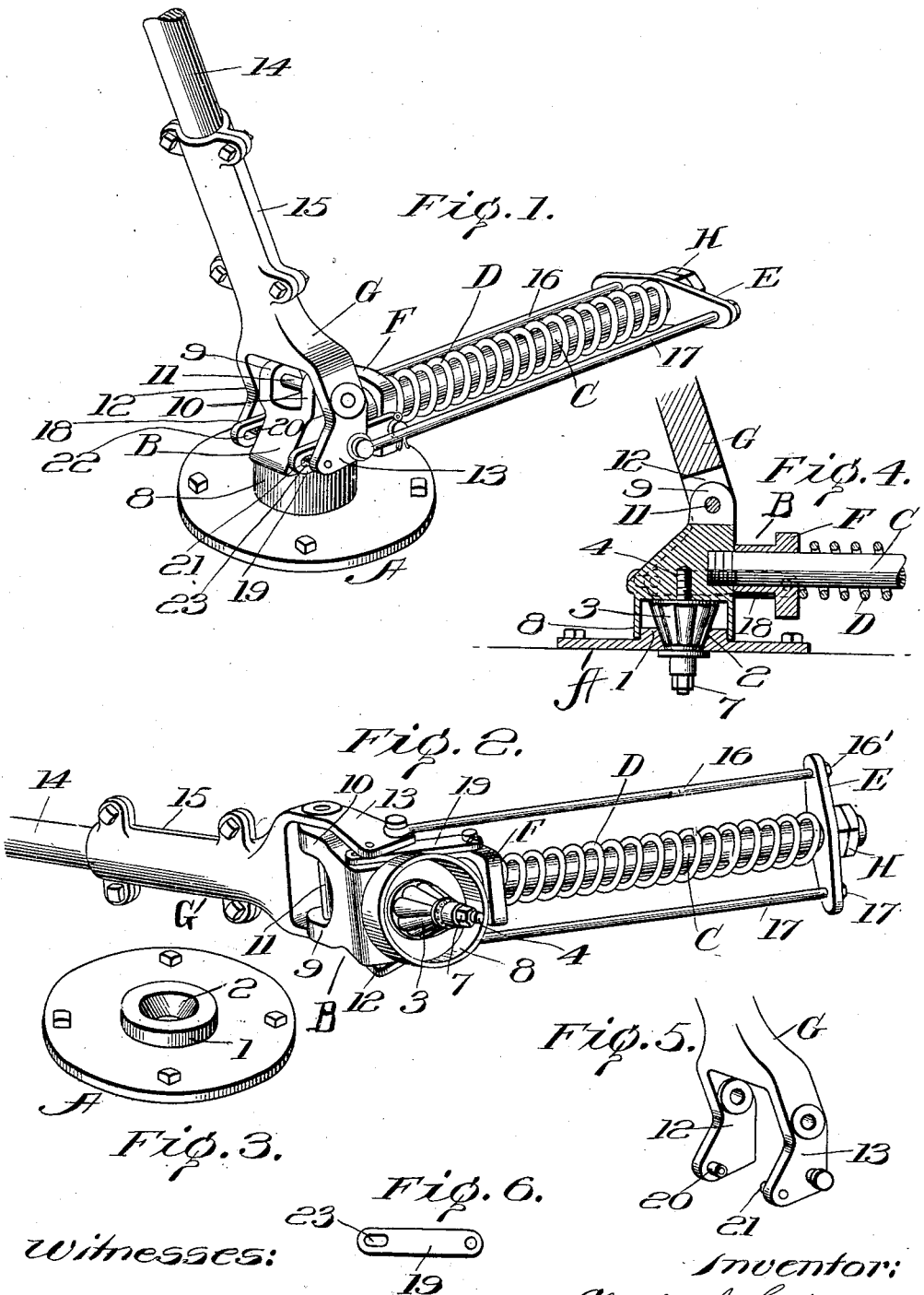
Witnesses:
L. C. Brady.
C. C. Wright.
Inventor:
Charles J. Geterman,
Edward R. Alexander,
Attorney.

UNITED STATES PATENT OFFICE.

CHARLES J. GETERMAN, OF CANTON, OHIO, ASSIGNOR TO JOHN E. McLAIN, OF CANTON, OHIO.

TROLLEY STAND OR BASE.

No. 912,557.  Specification of Letters Patent.  Patented Feb. 16, 1909.

Application filed June 4, 1908. Serial No. 436,729.

*To all whom it may concern:*

Be it known that I, CHARLES J. GETERMAN, a citizen of the United States, residing at Canton, in the county of Stark and State of Ohio, have invented certain new and useful Improvements in Trolley Stands or Bases, of which the following is a specification, reference being had therein to the accompanying drawings.

This invention relates to devices known in the art as trolley stands, devices of this class being employed to support the trolley poles upon the roofs of cars.

The object of the invention is to provide improved apparatus of the character described.

The invention can be best set forth in connection with the accompanying drawings, in which, Figure 1 is a perspective view of the stand, showing it in side elevation; Fig. 2 is a perspective view of the rotary portion of the stand, viewed from the bottom; Fig. 3 is a perspective view of the top of the base. Fig. 4 is a vertical central section of the stand. Fig. 5 is a perspective view of a portion of the trolley carrier. Fig. 6 is a side elevation of a link.

Referring to the drawings—the apparatus comprises a base A upon which is mounted a rotatable support B. From the support B, upon one side thereof, extends a rod C upon which is mounted a combined elevating and buffing spring D. At the outer end of the spring an abutment or cross head E slides upon the rod C, while at the inner end of the spring an abutment or cross head F slides upon the rod.

Pivoted upon the rotatable support B is a trolley pole carrier G and suitable connections are provided between the sliding abutments or cross heads referred to and the trolley pole carrier whereby the spring D is compressed from either end, the reaction of the abutment against the spring tending to compress the spring from its inner end as the free end of the trolley pole is depressed, while, when the pole is at or near its vertical position, the abutment E compresses the spring from its outer end and a buffing action to restrain the pole when the trolley jumps the wire is effected. At the outer end of the rod is located a stop H for the outer abutment, this being shown in the present instance as a pair of lock nuts.

The base A is secured to the top of a car in any suitable manner and is provided with a boss 1 within which is an aperture 2 having conical walls as shown and forming one part of a conical bearing.

The rotatable support B comprises a cone-shaped roller bearing adapted to engage with the walls of the aperture 2. The rollers 3 of this bearing are arranged about the stud 4, projecting from the bottom of the rotary support, in any suitable and well known manner. The support B is held in position on the base A by means of a nut 7 screwed on to the end of the stud 4. Surrounding the bearing is a collar 8 which extends from the bottom of the rotary support and, when the rotary support is in position upon the base, this collar projects down about the outside of the boss 1 thereby forming a joint which protects this bearing from dust. At the upper part of the rotary portion B are provided lugs 9 and 10 through which extends the pin 11 upon which is pivoted the trolley pole carrier or socket G.

The trolley pole carrier is bifurcated at its lower end to form the legs 12 and 13 which extend outside the rotary support upon opposite sides thereof. The upper end of the trolley pole carrier comprises a socket for the reception of the pole 14. In the structure shown, one-half of this socket is formed integrally with the legs of the carrier, the other half 15 of the socket being bolted thereto, as shown.

It will be noted that the carrier G is pivoted to the rotary support B at a point above the center line of the spring D. Below this pivot for the carrier G, rods 16 and 17 are pivoted to the outside of the legs 12 and 13 and extend to and through the outer abutment E and have heads or nuts 16', 17', respectively, on the outside of said abutment. These rods form the connections between the trolley carrier and the abutment whereby the spring D operates to cushion and restrain the movement of the trolley pole when the trolley leaves the wire. Also below the pivotal point of the carrier G, links 18 and 19 are pivoted to the insides of the legs 12 and 13 while the other ends of these links are pivoted to the inner abutment F.

It is desirable that the abutment E should not be moved as the trolley pole moves back and forth under the influence of the spring D acting through the instrumentality of the abutment F. It is desirable that this abutment E should be brought into action and cause the spring D to act as a buffer to limit the movement of the trolley pole when the trolley jumps the wire, when the pole is at or near its vertical position. Accordingly a lost motion connection is provided, between the legs 12 and 13 and the abutment E. This is accomplished in the structure shown by permitting the rods 16 and 17 to slide to the right (see Fig. 1) through the abutment E, the nuts on the ends of the rods coming against the outside of the abutment as the rods are moved to the left, carrying the abutment with them and compressing the spring. It is also desirable that the trolley carrier shall move backwardly independently of the abutment F after a certain point has been reached. A lost motion connection is therefore provided between the legs 12 and 13 and the abutment F, which is shown as consisting of the pins 20 and 21 which engage in the slots 22 and 23. When the trolley jumps the wire the slots 22 and 23 will permit the carrier to move rearwardly independently of the abutment F after the abutment has moved to its innermost position and the abutment E will be moved against the spring which will oppose its movement and give the required buffing action.

It is believed that the operation of the device will be obvious from the foregoing description. When the free end of the trolley pole is depressed to the left, as viewed in Fig. 1, and the trolley placed upon the wire, the abutment F will be moved outwardly, compressing the spring D which will then tend to elevate the trolley and press the same against the wire. The abutment E will be unmoved as indicated. If, however, the trolley jumps the wire the trolley pole on attaining or nearing its vertical position will be retarded by reason of the reaction of the spring D against the inward movement of the abutment E, the spring, under these circumstances acting as a buffer spring.

What I claim is—

1. In a trolley stand, the combination with a rotary support, of a combined elevating and buffer spring, a support for said spring extending at one side from said rotary support, a sliding abutment at the outer end of said spring adapted to compress said spring from its outer end, a sliding abutment at the inner end of said spring adapted to compress said spring from its inner end, a trolley pole carrier pivoted upon said rotary support, links connecting the said sliding abutment at the inner end of said spring with said trolley pole carrier, and connections between the said sliding abutment at the outer end of said spring and said trolley pole carrier.

2. In a trolley stand, the combination with a rotary support, of a rod extending at one side therefrom, a combined buffer and elevating spring mounted upon said rod, an abutment sliding on said rod at the outer end of said spring, an abutment sliding on said rod at the inner end of said spring, a trolley pole carrier pivoted upon said rotary support, connections between the said abutment at the outer end of said spring and said carrier and links connecting the said abutment at the inner end of said spring with said carrier.

3. In a trolley stand, the combination with a rotary support, of a rod extending at one side therefrom, a combined buffer and elevating spring mounted upon said rod, an abutment sliding on said rod at the outer end of said spring, an abutment sliding on said rod at the inner end of said spring, a trolley pole carrier pivoted upon said rotary support, connections between the said abutment at the outer end of said spring and said carrier and connections between said sliding abutment at the inner end of said spring and said carrier comprising links and lost motion connections.

4. In a trolley stand, the combination with a rotary support, of a rod extending at one side therefrom, a combined buffer and elevating spring mounted upon said rod, an abutment sliding on said rod at the outer end of said spring, an abutment sliding on said rod at the inner end of said spring, a trolley pole carrier pivoted upon said rotary support, connections between the said abutment at the outer end of said spring and said carrier and connections between said sliding abutment at the inner end of said spring and said carrier and comprising links and pin-and-slot connections.

5. In a trolley stand, the combination with a rotatable support, of a rod extending therefrom at one side, a combined buffer and elevating spring upon said rod, an abutment sliding upon said rod at the outer end of said spring, an abutment sliding upon said rod at the inner end of said spring, a bifurcated trolley pole carrier pivoted upon said support and having its legs extending upon opposite side of said rotatable support, connections between the abutment at the outer end of said spring and said carrier, the said connections being pivoted to the sides of said legs, and links connecting the said abutment at the inner end of said spring, the said links being pivoted to said legs upon the opposite sides thereof from the aforesaid connections between the outer abutment and said legs.

6. In a trolley stand, the combination with a rotatable support, of a rod extending therefrom at one side, a combined buffer and elevating spring upon said rod, an abutment sliding on said rod at the outer end of said spring, an abutment sliding on said rod at the inner end of said spring, a bifurcated trolley pole carrier pivoted to said support and having its legs extending upon opposite sides thereof, links connecting said abutment at the inner end of said spring with said legs, said links being pivoted upon the inner sides of said legs, and connections pivoted to the outsides of said legs and extending between said abutment at the outer end of said spring and said legs.

7. In a trolley stand, the combination of a base, a rod secured to the base, a sliding abutment mounted on the outer end of the rod, a sliding abutment mounted on the inner end of the rod, a combined elevating and buffer spring located between the said abutments and adapted to be compressed from each end, a trolley pole carrier pivotally secured to the base at a point above the center of the spring and connections extending between the said carrier and the said abutment on the outer end of the rod for sliding the last mentioned abutment when the pole rises to a predetermined height.

8. In a trolley stand, the combination of a base, a support rotatable thereon, a rod, a sliding abutment on the outer end of the rod, a second sliding abutment also mounted on the rod, a combined elevating and buffer spring surrounding the rod and located between the said abutments, stops for limiting the outward movement of the outer abutment, a bifurcated trolley pole carrier pivoted to the said base at a point above the center of the spring and links pivoted to the legs of the carrier and to the outer abutment and arranged to move the abutment when the trolley is at or near its vertical position.

9. In a trolley stand, the combination of a base, a rotatable support thereon, a rod extending from one side of said support, a sliding abutment on the outer end of the rod, a sliding abutment on the inner end of the rod, a combined elevating and buffer spring surrounding the rod and located between the abutments, a stop for limiting the outward movement of the outer abutment and a trolley pole carrier pivoted to said support, said carrier connected with said inner abutment to compress said spring from its inner end for pressing the trolley against the wire and connected with said outer abutment to compress the spring from its outer end when the trolley pole is at or near its vertical position.

In testimony whereof I affix my signature, in the presence of two witnesses.

CHARLES J. GETERMAN.

Witnesses:
C. A. COCHENOUR,
H. A. STALEY.